US012665713B2

(12) United States Patent
Shrivastava

(10) Patent No.: US 12,665,713 B2
(45) Date of Patent: Jun. 23, 2026

(54) METHODS AND APPARATUS FOR UE POWER SAVING USING TRS AND CSIRS CONFIGURATIONS IN WIRELESS COMMUNICATION SYSTEM

(71) Applicant: Samsung Electronics Co., Ltd., Suwon-si (KR)

(72) Inventor: Vinay Kumar Shrivastava, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 18/272,500

(22) PCT Filed: Jan. 21, 2022

(86) PCT No.: PCT/KR2022/001112
§ 371 (c)(1),
(2) Date: Jul. 14, 2023

(87) PCT Pub. No.: WO2022/158897
PCT Pub. Date: Jul. 28, 2022

(65) Prior Publication Data
US 2024/0080152 A1     Mar. 7, 2024

(30) Foreign Application Priority Data

Jan. 21, 2021    (IN) .............................. 202141002882
Dec. 20, 2021    (IN) .............................. 2021 41002882

(51) Int. Cl.
*H04L 5/00*          (2006.01)
*H04W 72/23*       (2023.01)

(52) U.S. Cl.
CPC ........... *H04L 5/0048* (2013.01); *H04W 72/23* (2023.01)

(58) Field of Classification Search
CPC ...... H04L 5/0048; H04W 4/029; H04W 72/23
See application file for complete search history.

(56) References Cited

U.S. PATENT DOCUMENTS

2018/0279152 A1*   9/2018   Kim .......................... H04B 7/00
2019/0215117 A1    7/2019   Lee et al.
(Continued)

FOREIGN PATENT DOCUMENTS

CN          110690947 A       1/2020

OTHER PUBLICATIONS

Lenovo et al., 'Provision of TRS/CSI-RS for idle/inactive UEs', R1-2100999, 3GPP TSG RAN WG1 Meeting #104-e, Jan. 19, 2021.
(Continued)

*Primary Examiner* — Brian P Cox
(74) *Attorney, Agent, or Firm* — Jefferson IP Law, LLP

(57)          ABSTRACT

The disclosure relates to a 5G or 6G communication system for supporting a higher data transmission rate. A method performed by a terminal in a wireless communication system is provided. The method includes receiving, from a base station, a configuration information for at least one of a tracking reference signal (TRS) configuration or a channel state information-reference signal (CSI-RS) configuration, and receiving, from the base station, at least one of a TRS or a CSI-RS based on the configuration information. At least one of the TRS or the CSI-RS is received when the terminal is in an idle mode or an inactive mode.

15 Claims, 5 Drawing Sheets

(56) References Cited

U.S. PATENT DOCUMENTS

| | | | |
|---|---|---|---|
| 2020/0029316 A1 | 1/2020 | Zhou et al. | |
| 2020/0146095 A1 | 5/2020 | Hsieh et al. | |
| 2020/0220697 A1 | 7/2020 | Lee et al. | |
| 2023/0189150 A1* | 6/2023 | Hsieh ................. | H04W 68/025 |
| | | | 370/311 |

OTHER PUBLICATIONS

Xiaomi Communications, 'Discussion on TRS CSI-RS for RRC-IDLE and RRC-INACTIVE State UE', R2-2008946, 3GPP TSG-RAN WG2 Meeting #112 electronic, Oct. 23, 2020.

ZTE, 'Reference signal for RRC idle and inactive UEs', R1-2007972, 3GPP TSG RAN WG1 #103-e, Nov. 1, 2020.

Indian Office Action dated Dec. 13, 2022, issued in Indian Patent Application No. 202141002882.

Sony, Discussion on TRS/CSI-RS configuration of idle/inactive-mode UEs, 3GPP Draft, R2-2100912, 3GPP TSG RAN WG2 Meeting #113-e, Online meeting, Jan. 14, 2021.

CATT, Configuration of TRS/CSI-RS for paging enhancement, 3GPP Draft, R1-2100393, 3GPP TSG RAN WG1 #104-e, e-Meeting, Jan. 19, 2021.

Extended European Search Report dated May 28, 2024, issued in European Patent Application No. 22742873.7.

* cited by examiner

Figures 1, 2, 3, 4:
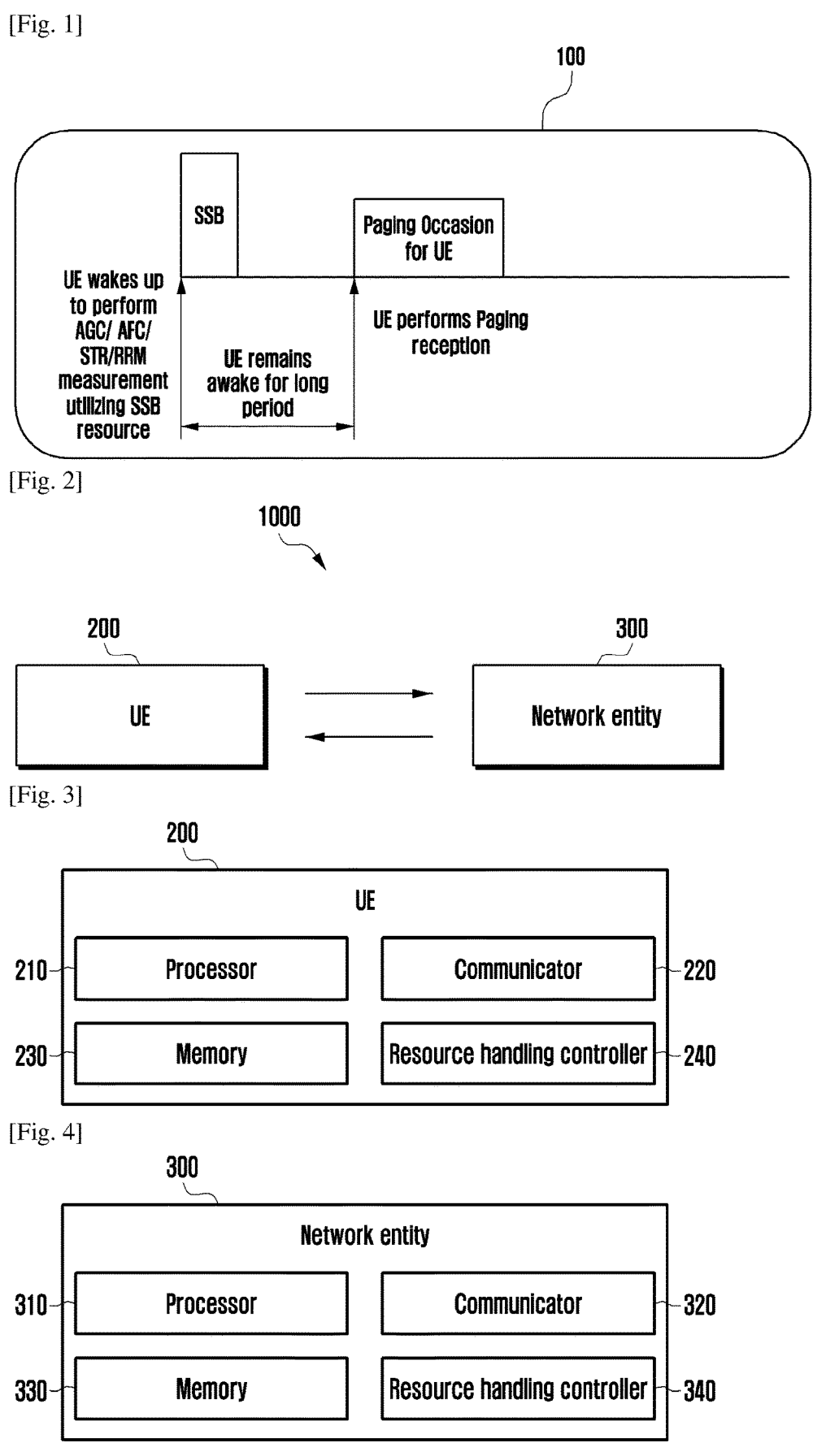

SSB

Paging Occasion
for UE

UE wakes up
to perform
AGC/ AFC/
STR/RRM
measurement
utilizing SSB
resource

UE remains
awake for long
period

UE performs Paging
reception

Network entity

210 — Processor

220 — Communicator

230 — Memory

240 — Resource handling controller

Network entity

310 — Processor

320 — Communicator

330 — Memory

340 — Resource handling controller

[Fig. 5]
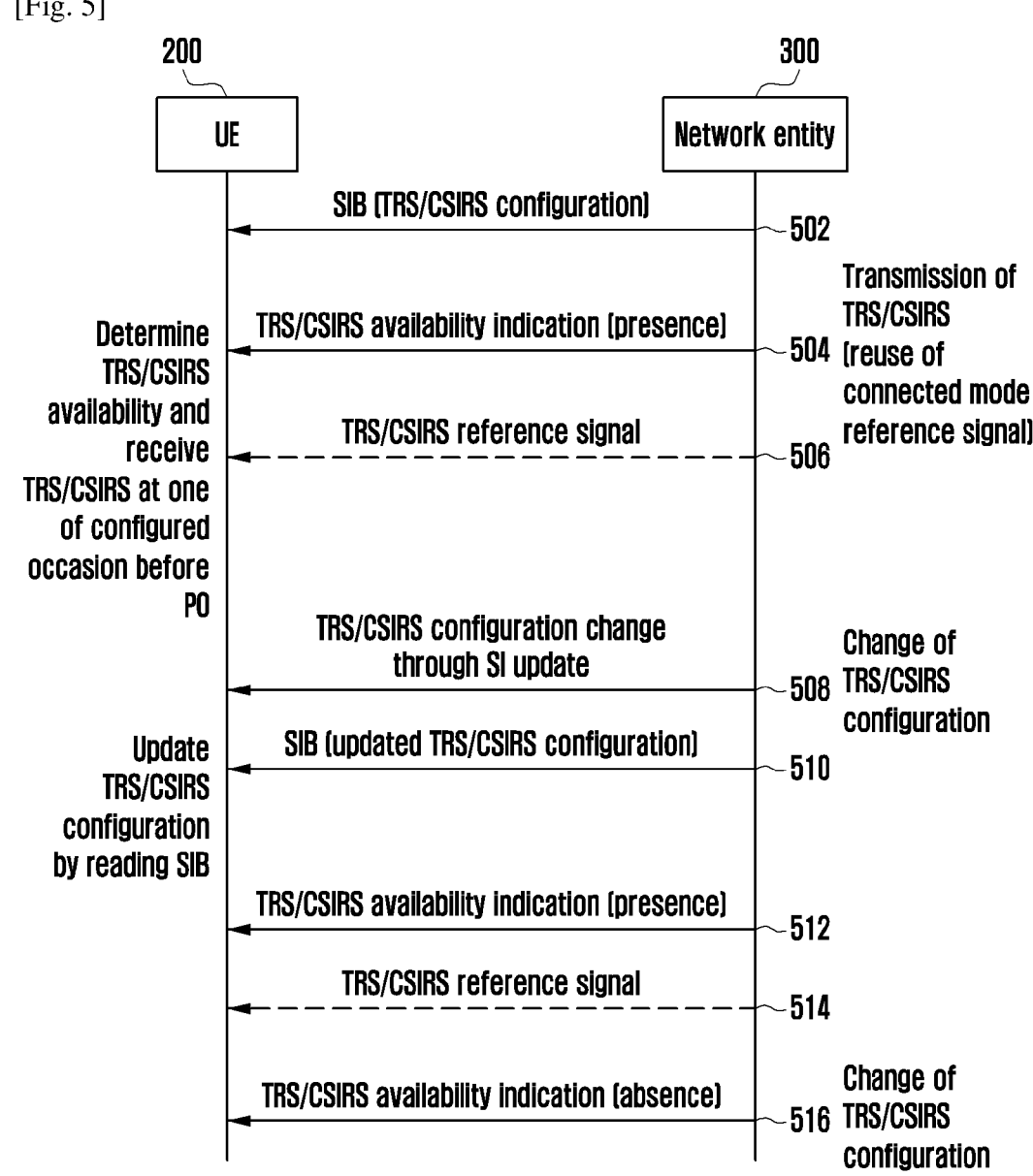

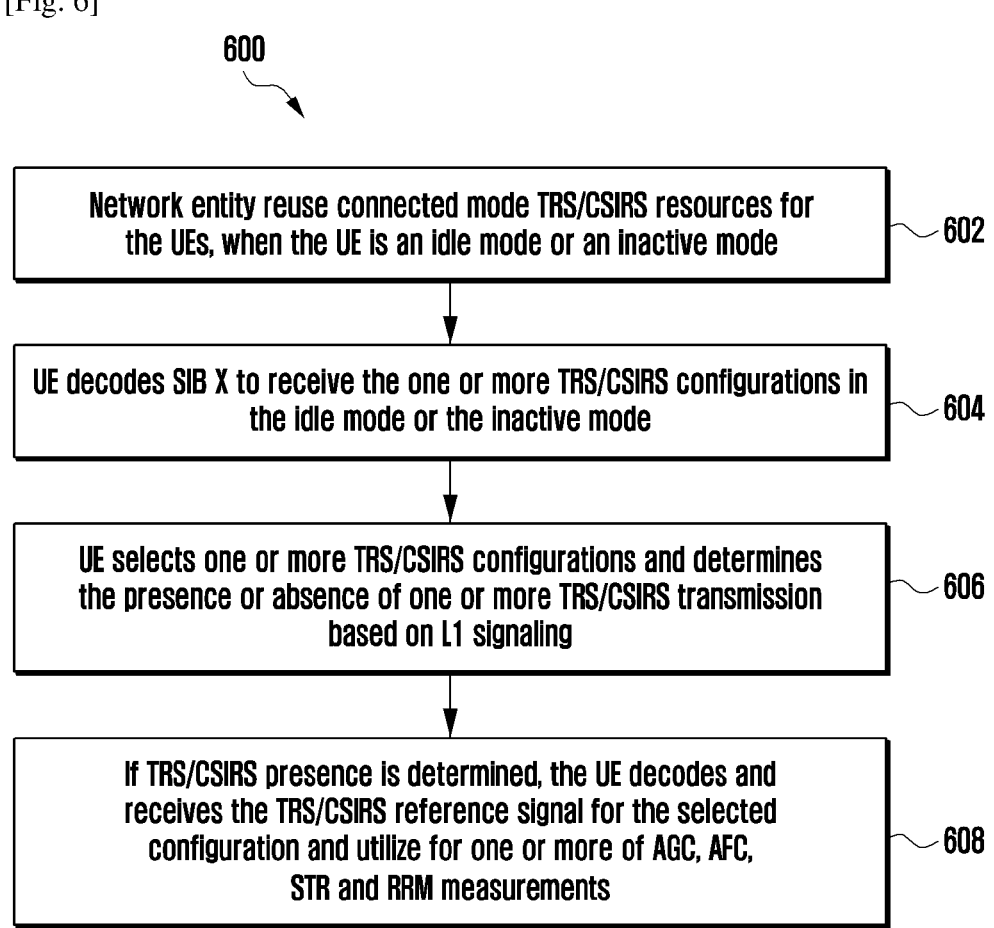

Network entity reuse connected mode TRS/CSIRS resources for the UEs, when the UE is an idle mode or an inactive mode — 602

UE decodes SIB X to receive the one or more TRS/CSIRS configurations in the idle mode or the inactive mode — 604

UE selects one or more TRS/CSIRS configurations and determines the presence or absence of one or more TRS/CSIRS transmission based on L1 signaling — 606

If TRS/CSIRS presence is determined, the UE decodes and receives the TRS/CSIRS reference signal for the selected configuration and utilize for one or more of AGC, AFC, STR and RRM measurements — 608

[Fig. 7]

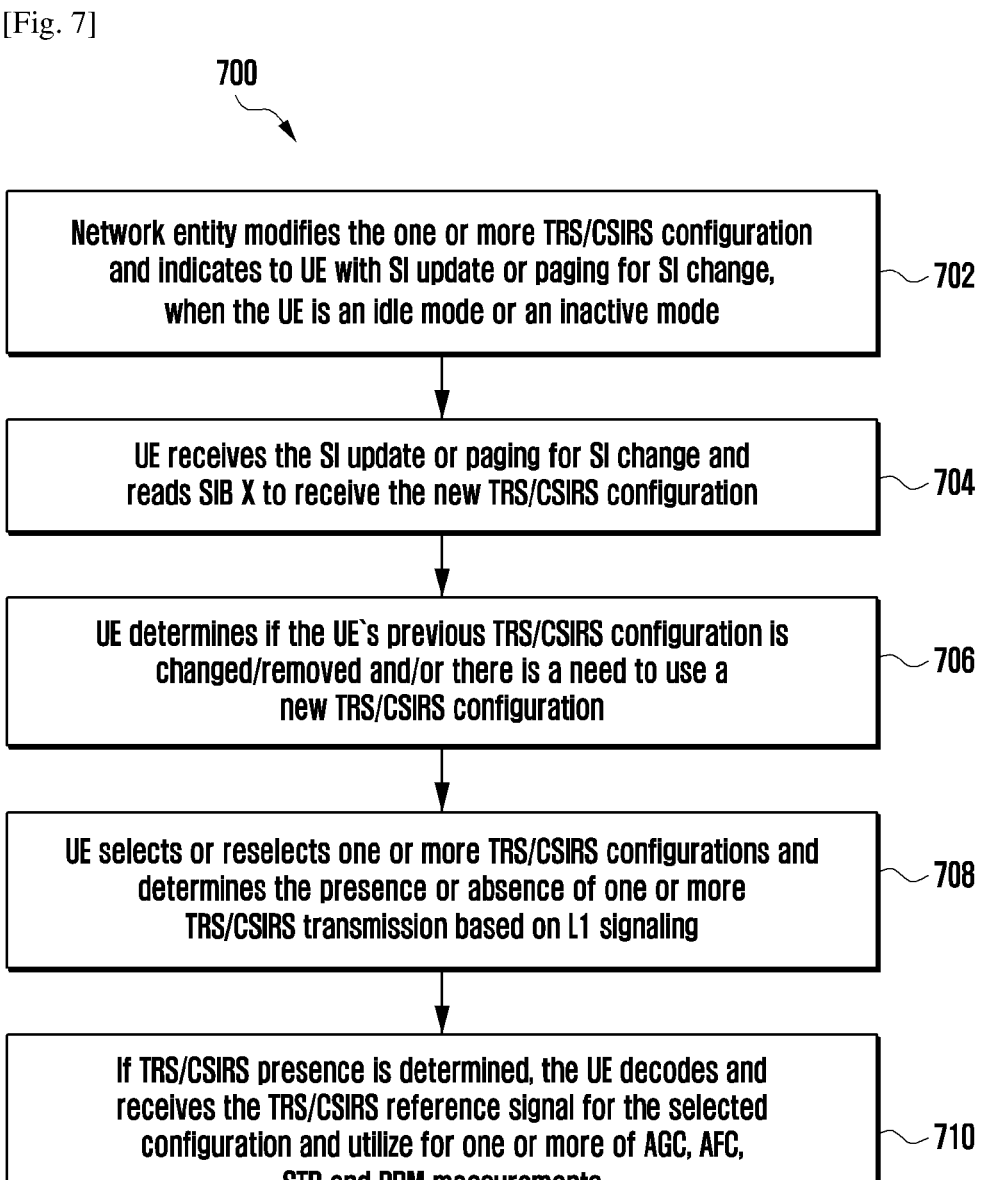

700

| Network entity modifies the one or more TRS/CSIRS configuration and indicates to UE with SI update or paging for SI change, when the UE is an idle mode or an inactive mode | 702 |

| UE receives the SI update or paging for SI change and reads SIB X to receive the new TRS/CSIRS configuration | 704 |

| UE determines if the UE's previous TRS/CSIRS configuration is changed/removed and/or there is a need to use a new TRS/CSIRS configuration | 706 |

| UE selects or reselects one or more TRS/CSIRS configurations and determines the presence or absence of one or more TRS/CSIRS transmission based on L1 signaling | 708 |

| If TRS/CSIRS presence is determined, the UE decodes and receives the TRS/CSIRS reference signal for the selected configuration and utilize for one or more of AGC, AFC, STR and RRM measurements | 710 |

[Fig. 8]

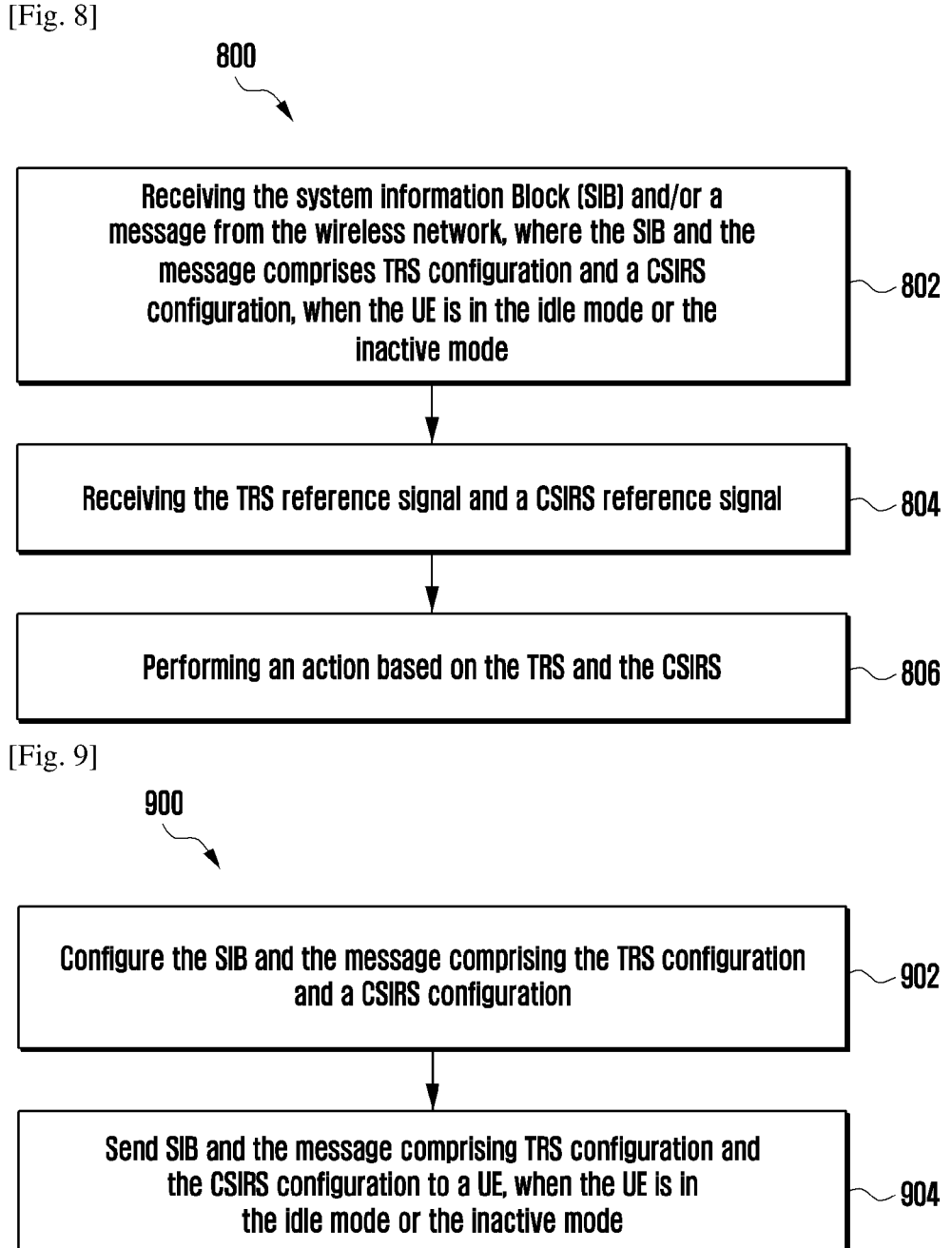

800

Receiving the system information Block (SIB) and/or a
message from the wireless network, where the SIB and the
message comprises TRS configuration and a CSIRS
configuration, when the UE is in the idle mode or the
inactive mode                                                    802

Receiving the TRS reference signal and a CSIRS reference signal    804

Performing an action based on the TRS and the CSIRS    806

Configure the SIB and the message comprising the TRS configuration
and a CSIRS configuration                                        902

Send SIB and the message comprising TRS configuration and
the CSIRS configuration to a UE, when the UE is in
the idle mode or the inactive mode                              904

METHODS AND APPARATUS FOR UE POWER SAVING USING TRS AND CSIRS CONFIGURATIONS IN WIRELESS COMMUNICATION SYSTEM

TECHNICAL FIELD

The present disclosure relates to wireless communication networks, and more particularly relates to methods and systems for User Equipment (UE) power saving using a Tracking Reference Signal (TRS) configuration and a Channel State Information Reference Signal (CSIRS) configuration.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Technical Problem

In the idle/inactive mode, an NR (new radio) UE wakes up at pre-defined intervals to perform the paging procedure. An NR cell transmits paging information periodically at the paging occasion (PO) in the paging frame (PF) and the UE should be capable to decode paging information to know if the UE is being paged. However, in order to improve receiver performance UE must perform timing, frequency and gain acquisition before PF/PO.

In a legacy NR, the only reference signal that can be used by idle/inactive mode UE for the AGC (Automatic Gain Control) operation is the SSS (Secondary Synchronization Signal)/PBCH DMRS (Physical Broadcast Channel Demodulation Reference Signal) signal present as part of SSB (Synchronization Signal Block). By default, the periodicity of SSB is 20 ms, and hence the UE has to compute its wakeup considering the position of both SSB and PO in the idle DRX (Discontinuous Reception). In cases, when the PO and SSBs are not aligned, the UE may have to wakeup much ahead of PO for the SSB acquisition. However, this would not be the optimum as it may result in high power consumption in the Idle/Inactive mode as the UE has to remain awake for longer duration. Also, the gain compensated using an AGC control block would be outdated with respect to channel conditions of the PO.

This may require UE to wake up many slots before PO unnecessarily to decode SSB signal. Additionally, as the SSB occasions could be far apart to the PO so the present approach, may not be power efficient in all cases and may not give optimal time, frequency and gain adjustment just before the PO.

Solution to Problem

In accordance with an aspect of the disclosure, a method performed by a terminal in a wireless communication system is provided. The method includes receiving, from a base station, a configuration information for at least one of a tracking reference signal (TRS) configuration or a channel state information-reference signal (CSI-RS) configuration, and receiving, from the base station, at least one of a TRS or a CSI-RS based on the configuration information. At least one of the TRS or the CSI-RS is received when the terminal is in an idle mode or an inactive mode.

In accordance with another aspect of the disclosure, a method performed by a base station in a wireless communication system is provided. The method includes transmitting, to a terminal, a configuration information for at least one of a TRS configuration or a CSI-RS configuration, and transmitting, to the terminal, at least one of a TRS or a CSI-RS according to the configuration information. At least one of the TRS or the CSI-RS is transmitted when the terminal is in an idle mode or an inactive mode.

In accordance with another aspect of the disclosure, a terminal in a wireless communication system is provided. The terminal includes a transceiver and a controller. The controller is configured to receive, from a base station via the transceiver, a configuration information for at least one of a TRS configuration or a CSI-RS configuration, and receive, from the base station via the transceiver, at least one of a TRS or a CSI-RS based on the configuration information. At least one of the TRS or the CSI-RS is received when the terminal is in an idle mode or an inactive mode.

In accordance with another aspect of the disclosure, a base station in a wireless communication system is provided. The base station includes a transceiver and a controller. The controller is configured to transmit, to a terminal via the transceiver, a configuration information for at least one of a TRS configuration or a CSI-RS configuration, and transmit, to the terminal via the transceiver, at least one of a TRS or a CSI-RS according to the configuration information. At least one of the TRS or the CSI-RS is transmitted when the terminal is in an idle mode or an inactive mode.

Accordingly, the embodiments herein provide methods for UE power saving with efficient resource usage in a wireless network. The method includes receiving, by an UE, at least one of a SIB and a message from a network entity. At least one of the SIB and the message includes at least one of a TRS configuration and a CSIRS configuration, when the UE is in an idle mode or an inactive mode. Further, the method includes receiving, by the UE, at least one of a TRS reference signal and a CSIRS reference signal from the network entity. Further, the method includes performing, by the UE, at least one action based on at least one of the TRS reference signal and the CSIRS reference signal.

In an embodiment, the message includes at least one of a radio resource control (RRC) release message, a RRC release with suspend configuration message, a RRC release with redirection message, a RRC configuration message and a RRC reconfiguration message.

In an embodiment, further, the method includes determining, by the UE, a change of at least one of the TRS configuration and the CSIRS configuration through at least one of a system information (SI) update and a paging for SI change. Further, the method includes receiving, by the UE, a new SIB comprising at least one of a modified TRS configuration and a modified CSIRS configuration from the network entity, when the UE receives at least one of the SI update and the paging for SI change. Further, the method includes updating, by the UE, the at least one of the modified TRS configuration and the modified CSIRS configuration at the UE. Further, the method includes performing, by the UE, at least one action based on the at least one of the modified TRS configuration and the modified CSIRS configuration.

In an embodiment, wherein the at least one of the TRS configuration and the modified CSIRS configuration is reselected at the UE, when a modified TRS configuration and a modified CSIRS configuration is not suitable for the UE.

In an embodiment, further, the method includes receiving, by the UE, an indication from the network entity, where the indication indicates at least one of a presence of the TRS configuration, a presence of the CSIRS configuration, an absence of the TRS configuration, and an absence of the CSIRS configuration, wherein the indication comprises at least one of bit information, bitmap, code-points and a list of configuration indices.

In an embodiment, the at least one of the presence of the TRS configuration, the presence of the CSIRS configuration, the absence of the TRS configuration, and the absence of the CSIRS configuration is received through at least one of a Paging Downlink Control Information (DCI), a paging Physical Downlink Control Channel (PDCCH), a paging for SIB modification, a short message, a PDCCH DCI, a Wake-up Signaling (WUS), and a Paging Early Indication (PEI).

In an embodiment, signaling for presence or absence of TRS configuration and CSIRS configuration can be enabled or disable by the network entity. The UE is informed for enabling or disabling for the signaling for presence or absence of TRS configuration and CSIRS configuration by broadcast signaling e.g. a SIB.

In an embodiment, a reuse of the at least one TRS configuration and the CSIRS configuration of the connected mode UEs is identified by the UE by presence of scheduling information in a SIB1 of the new SIB that carries TRS configuration and the CSIRS configuration, when the UE is in an idle mode or an inactive mode.

In an embodiment, the UE changes the at least one TRS configuration and the CSIRS configuration when at least one of a Paging Frame (PF) or Paging Occasion (PO) changes, the at least one of the TRS configuration and the CSIRS configuration is modified or is no longer available/transmitted by the network entity, a power saving performance is activated at the UE, and signal strength degradation is detected at the UE.

In an embodiment, the UE releases or abandons a CSIRS reference signal configurations and a TRS reference signal configuration, when the UE transits from the idle mode or the inactive mode to a connected mode, wherein the CSIRS reference signal configurations and the TRS reference signal configuration is received during the idle mode or the inactive mode.

In an embodiment, the UE needs to change between a Core Network (CN) paging and Radio Access Network (RAN) paging and associated paging cycle and configurations, the UE determines the CSIRS occasions and TRS occasions that the UE receives that matches with the paging occasion or are closer to the paging occasion in respective paging mode, when the UE transits between the idle mode or the inactive mode.

In an embodiment, the at least one of the TRS configuration and the CSIRS configuration comprises at least one of a periodic resource-type, an aperiodic resource-type, a semi-persistent resource-type, a scrambling identity, a sequence generation configuration, a resource periodicity and offset, a sub-carrier spacing, physical resource blocks, a start of physical resource block, a density of reference signal, frequency domain allocation, number of ports, code division multiplexing, in time domain first Orthogonal Frequency Division Multiplex (OFDM) symbol, a frequency band, a CSIRS index, a TRS index, Quasi-colocation information, a SSB information, a serving cell for timing reference, and a BWP identity.

In an embodiment, the UE performs transitions from a legacy SSB based approach to the at least one of the TRS configuration and the CSIRS configuration based reuse approach and falls back from the at least one of the TRS configuration and the CSIRS configuration reuse approach to the legacy SSB based approach.

In an embodiment, the UE performs transition to the legacy approach when the UE performs at least one of a cell selection and a cell reselection and when a selected cell or the reselected cell does not provide reuse of at least one of a connected mode CSIRS reference signal configuration and a connected mode TRS reference signal configuration in an idle mode or an inactive mode.

In an embodiment, the UE performs transition to at least one of the TRS configuration and the CSIRS configuration based reuse approach when the selected cell or reselected cell provides reuse of reuse of at least one of a connected mode CSIRS reference signal configuration and a connected mode TRS reference signal configuration in the idle mode or the inactive mode, when the UE performs cell selection and/or cell reselection from a cell supporting only legacy SSB based approach.

In an embodiment, further, the method includes determining, by the UE, that at least one of the presence of the TRS configuration and the presence of the CSIRS configuration is detected at the UE. Further, the method includes determining, by the UE, at least one the TRS configuration and the CSIRS configuration is suitable with respect to at least one of paging occasion (PO) of the UE and a Paging Frame (PF) of the UE. Further, the method includes receiving, by the UE, the at least one of the TRS configuration and the CSIRS configuration at a configured occasion prior to at least one of the PO and the PF. Further, the method includes performing, by the UE, at least one action based on the at least one of the TRS and the CSIRS.

In an embodiment, the at least one action comprises at least one of an Automatic Gain Control (AGC) measurement, a Symbol Time Recovery (STR) measurement, an Automatic Frequency Control (AFC) measurement and a Radio Resource Management (RRM) measurement.

In an embodiment, the at least one of CSIRS configuration and the TRS configuration provided in at least one of an initial BWP, a default BWP and a dedicated BWPs for the UEs in a connected mode is reused for the UE in the idle mode or the inactive mode.

Accordingly, the embodiments herein provide methods for handling resource usage in a wireless network. The method includes configuring, by a network entity, at least one of a SIB and a message comprising at least one of a TRS configuration and a CSIRS configuration. Further, the method includes sending, by the network entity, the at least one of the SIB and the message comprising at least one of the TRS configuration and the CSIRS configuration to a User Equipment (UE), when the UE is in an idle mode or an inactive mode. The message may comprise at least one of a radio resource control (RRC) release message, a RRC release with suspend configuration message, a RRC release with redirection message, and a RRC configuration or reconfiguration message.

In an embodiment, the method includes sending, by the network entity, at least one of a TRS reference signal and a CSIRS reference signal to the UE.

In an embodiment, the method includes determining, by the network entity, a change of at least one of the TRS configuration and the CSIRS configuration. Further, the method includes sending, by the network entity, the change of at least one of the TRS configuration and the CSIRS configuration through at least one of a system information (SI) update and a paging for SI change to the UE.

In an embodiment, the method includes sending, by the network entity, the at least one of the presence of the TRS configuration, the presence of the CSIRS configuration, the absence of the TRS configuration, and the absence of the CSIRS configuration to the UE through at least one of a Paging Downlink Control Information (DCI), a Paging PDCCH, a Paging for SIB modification, a Short message, a PDCCH DCI, a Wake-up Signaling (WUS), and a Paging Early Indication (PEI).

In an embodiment, the method includes enabling or disabling, by the network entity, the signaling for presence or absence of TRS configuration and CSIRS configuration. Further, the method includes, informing, by the network entity, enabling or disabling for the signaling for presence or absence of TRS configuration and CSIRS configuration by broadcast signaling to the UE e.g. a SIB.

In an embodiment, the method includes determining, by the network entity, that at least one of the TRS configuration and the CSIRS configuration is not transmitted to the UE. Further, the method includes sending, by the wireless network, an indication to the UE, wherein the indication indicates that at least one of the TRS configuration and the CSIRS configuration is not transmitted from the wireless network.

In an embodiment, the at least one of the TRS configuration and the CSIRS configuration from a plurality of TRS configuration and a plurality of CSIRS configuration used for connected mode UEs is reused for the UE by the network entity, when the UE is in an idle mode or an inactive mode.

Accordingly, the embodiments herein provide a UE includes a resource handling controller coupled to a memory and a processor. The resource handling controller is configured to receive at least one of a SIB and a message from a network entity. The at least one of the SIB and the message includes at least one of a TRS configuration and a CSIRS configuration, when the UE is in an idle mode or an inactive mode. Further, the resource handling controller is configured to receive at least one of a TRS reference signal and a CSIRS reference signal from the network entity. Further, the resource handling controller is configured to perform at least one action based on at least one of the TRS reference signal and the CSIRS reference signal.

Accordingly, the embodiments herein provide a network entity includes a resource handling controller coupled to a memory and a processor. The resource handling controller is configured to configure at least one of a SIB and a message comprising at least one of a TRS configuration and a CSIRS configuration. Further, the resource handling controller is configured to send the at least one of the SIB and the message comprising at least one of the TRS configuration and the CSIRS configuration to a UE, when the UE is in an idle mode or an inactive mode. The message may comprise at least one of a radio resource control (RRC) release message, a RRC release with suspend configuration message, a RRC release with redirection message, and a RRC configuration or reconfiguration message.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

Advantageous Effects of Invention

The principal object of the embodiments herein is to disclose methods and systems for power saving for an idle and inactive mode UE in a 5G wireless communication system by provisioning the reuse of connected mode reference signal for the idle/inactive mode UE and also reducing the system load. Thus results in enhancing a battery performance of the UE and scaling the resource utilization of a network entity and improving user experience.

Another object of the embodiments herein is to provide configurations for TRS/CSIRS resources and signalling.

Another object of the embodiments herein is to indicate a change of TRS/CSIRS configurations.

Another object of the embodiments herein is to provide a presence/absence indication for TRS/CSIRS configurations.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 1 is an example illustration in which a UE wakes up to perform AGC/AFC/STR/RRM measurement utilizing a SSB resource;

FIG. 2 is another overview of a wireless network for UE power saving in the wireless network using a TRS configuration and a CSIRS configuration, according to embodiments as disclosed herein;

FIG. 3 shows various hardware components of a UE, according to embodiments as disclosed herein;

FIG. 4 shows various hardware components of a network entity, according to embodiments as disclosed herein;

FIG. 5 is a sequence diagram illustrating a method for the UE power saving in the wireless network using the TRS configuration and the CSIRS configuration, according to embodiments as disclosed herein;

FIG. 6 is an example flow chart illustrating a method for the UE power saving in the wireless network using the TRS configuration and the CSIRS configuration, according to an embodiment as disclosed herein;

FIG. 7 is an example flow chart illustrating a method for the UE power saving in the wireless network using the TRS configuration and the CSIRS configuration, according to an embodiment as disclosed herein;

FIG. 8 is a flow chart illustrating a method, implemented by the UE, for the UE power saving in the wireless network using the TRS configuration and the CSIRS configuration, according to embodiments as disclosed herein; and FIG. 9 is a flow chart illustrating a method, implemented by the network entity, for the UE power saving in the wireless network using the TRS configuration and the CSIRS configuration, according to embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for handling resource usage in a wireless network. The method includes receiving, by an UE, at least one of a SIB and a message from a network entity. At least one of the SIB and the message includes at least one of a TRS configuration and a CSIRS configuration, when the UE is in an idle mode or an inactive mode. Further, the method includes receiving, by the UE, at least one of a TRS reference signal and a CSIRS reference signal from the network entity. Further, the method includes performing, by the UE, at least one action based on at least one of the TRS reference signal and the CSIRS reference signal.

The proposed methods can be used for power saving for an idle and inactive mode UE in a 5G wireless communication system by provisioning the reuse of connected mode reference signal for the idle/inactive mode UE and also reducing the system load. Thus results in enhancing a battery performance of the UE and scaling resource utilization of a network entity and improving user experience.

Referring now to the drawings, and more particularly to FIG. 1 to FIG. 9, where similar reference characters denote corresponding features consistently throughout the figures, there are shown at least one embodiment.

FIG. 1 is an example illustration in which a UE wakes up to perform AGC/AFC/STR/RRM measurement utilizing a SSB resource.

There is an excessive power consumption during an idle/inactive mode for an AGC (Automatic Gain Control), a STR (Symbol Time Recovery), an AFC (Automatic Frequency Control) and a RRM (Radio Resource Management) measurements, when utilizing a legacy SSB (Synchronization Signal/PBCH Block Block) which comprises of SSS (secondary synchronization signal) or PBCH DMRS (Physical Broadcast Channel Demodulation Reference signal) for the afore-mentioned purposes.

One of the reason for excessive power consumption is that the occurrence of the SSB which is typically periodic (default periodicity of 20 milliseconds (ms)) may not align with the paging occasions where the UE awakes and monitors for a paging message. Consequently, the UE needs to awake for longer duration to receive the SSB reference signals and perform measurements in order to tune the AGC, AFC and STR or perform RRM measurements.

Further an NR UE (New Radio or 5G UE) in the idle/inactive mode calculates its Paging Occasion (PO) and Paging Frame (PF) based on its UE ID and N, where UE ID: 5G-S-TMSI mod 1024, and N: number of total paging frames in a Discontinuous Reception (DRX) cycle T of the UE. Based on the PO and the PF, the UE monitors PDCCH (Physical Downlink Control Channel) to read paging DCI i.e., Downlink Control Information (DCI format 1_0 with CRC scrambled by a P-RNTI i.e., Paging Radio Network Terminal Identifier) and further reads the paging message. The UE decides if the paging message is intended for it only after reading the actual paging message. All other UEs discard the paging message as a False Alarm. This way, a group of UEs (paging group) reads the PDCCH and further paging messages based on respective UE_ID and N on the same PO and PF.

In the 5$^{th}$ generation (also referred as NR or New Radio) wireless communication system, the UE may use Discontinuous Reception (DRX) in a RRC_IDLE and a RRC_INACTIVE state in order to reduce power consumption. In the RRC_IDLE/RRC_INACTIVE state, the UE wake ups at regular intervals (i.e., every DRX cycle) for short periods to receive paging, to receive SI (system Information) update notification and to receive emergency notifications. The paging message is transmitted using a physical downlink shared channel (PDSCH). A Physical downlink common control channel (PDCCH) is addressed to the P-RNTI, if there is a paging message in the PDSCH. The P-RNTI is common for all UEs. The UE identity (i.e., S-TMSI for RRC_IDLE UE or I-RNTI for RRC_INACTIVE UE) is included in the paging message to indicate paging for the specific UE. The paging message may include multiple UE identities to page multiple UEs. The paging message is broadcasted (i.e., PDCCH is masked with P-RNTI) over a data channel (i.e., PDSCH). A SI update and emergency notifications are included in the DCI and the PDCCH carrying this DCI is addressed to the P-RNTI. In the RRC idle/inactive mode, the UE monitors one paging occasion (PO) every DRX cycle. In the RRC idle/inactive mode, the UE monitors the PO in the initial DL BWP. In the RRC connected state, the UE monitors one or more POs to receive the SI update notification and to receive emergency notifications. The UE can monitor any PO in the paging DRX cycle and monitors at least one PO in the SI modification period. In the RRC idle/inactive mode, the UE monitors the PO in its active DL BWP. The PO is a set of 'S' PDCCH monitoring occasions for paging, where 'S' is the number of transmitted SSBs (i.e., the Synchronization Signal and PBCH block (SSB) comprises of primary and secondary synchronization signals (PSS, SSS) and PBCH) in the cell. The UE first determines the paging frame (PF) and then determines the PO with respect to the determined PF. One PF is a radio frame (10 ms).

The PF for the UE is the radio frame with system frame number 'SFN' which satisfies the equation (SFN+PF_offset)

mod T=(T div N)*(UE_ID mod N). Index (i_s), indicating the index of the PO is determined by i_s=floor(UE_ID/N) mod Ns.

T is DRX cycle of the UE. In RRC_INACTIVE state, T is determined by the shortest of the UE specific DRX value configured by the RRC, the UE specific DRX value configured by a Non-access stratum (NAS), and a default DRX value broadcast in system information. In the RRC_IDLE state, T is determined by the shortest of UE specific DRX value configured by the NAS, and a default DRX value broadcast in system information. If the UE specific DRX is not configured by upper layers (i.e., NAS), the default value is applied.

N: number of total paging frames in T, Ns: number of paging occasions for a PF, PF_offset: offset used for PF determination and UE_ID: 5G-S-TMSI mod 1024. Parameters Ns, nAndPagingFrameOffset, and the length of default DRX Cycle are signaled in SIB1. The values of N and PF_offset are derived from the parameter nAndPagingFrameOffset signaled by gNB. If the UE has no 5G-S-TMSI (for instance, when the UE has not yet registered onto the network), the UE shall use UE_ID=0 as the default identity in the PF and i_s formulas above.

In the idle/inactive mode, the NR UE wakes up at pre-defined intervals to perform the paging procedure. An NR cell transmits paging information periodically at the paging occasion (PO) in the paging frame (PF) and the UE should be capable to decode paging information to know if the UE is being paged. However, in order to improve receiver performance UE must perform timing, frequency and gain acquisition before PF/PO.

In a legacy NR, the only reference signal that can be used by idle/inactive mode UE for the AGC operation is the SSS (Secondary Synchronization Signal)/PBCH DMRS (Physical Broadcast Channel Demodulation Reference Signal) signal present as part of SSB (Synchronization Signal Block). By default, the periodicity of SSB is 20 ms, and hence the UE has to compute its wakeup considering the position of both SSB and PO in the idle DRX. In cases, when the PO and SSBs are not aligned, the UE may have to wakeup much ahead of PO for the SSB acquisition. However, this would not be the optimum as it may result in high power consumption in the Idle/Inactive mode as the UE has to remain awake for longer duration. Also, the gain compensated using an AGC control block would be outdated with respect to channel conditions of the PO.

This may require UE to wake up many slots before PO unnecessarily to decode SSB signal. Additionally, as the SSB occasions could be far apart to the PO so the present approach, may not be power efficient in all cases and may not give optimal time, frequency and gain adjustment just before the PO.

FIG. 2 is another overview of a wireless network (1000) for a UE power saving in the wireless network (1000) using a TRS configuration and a CSIRS configuration, according to embodiments as disclosed herein. The wireless network (1000) can be, for example, but not limited to a 5G network, a 6G network and an Open-Radio Access Network (O-RAN) network. In an embodiment, the wireless network (1000) includes a UE (200) and a network entity (300).

The UE (200) can be, for example, but not limited to a laptop, a desktop computer, a notebook, a relay device, a vehicle to everything (V2X) device, a smartphone, a tablet, an internet of things (IoT) device, a Television with communication facility, an immersive device, a virtual reality device, a foldable device or the like. The UE can also include low power and low cost devices which utilizes extended DRx (eDRX). The network entity (300) may also include or be referred to by those skilled in the art as a base station, a base transceiver station, a radio base station, an access point, a radio transceiver, an eNB, a gNodeB (gNB), 6G base station or the like.

The network entity (300) configures at least one of a SIB and a message comprising a TRS configuration and a CSIRS configuration. The message comprises a radio resource control (RRC) release message, a RRC release with suspend configuration message, a RRC release with redirection message, and a RRC configuration or reconfiguration message. Further, the network entity (300) is configured to send the SIB and the message comprising at least one of the TRS configuration and the CSIRS configuration to the UE (200), when the UE (200) is in an idle mode or an inactive mode. The UE (200) receives the SIB and the message from the network entity (300). Further, the network entity (300) is configured to send at least one of the TRS reference signal and the CSIRS reference signal to the UE (200). The UE (200) receives at least one of the TRS reference signal and the CSIRS reference signal from the network entity (300). Further, the UE (200) is configured to perform the at least one action based on at least one of the TRS reference signal and the CSIRS reference signal. The action can include, for example, but not limited to AGC measurement, the STR measurement, the AFC measurement and the RRM measurement.

The various approaches/techniques for configuring and receiving the TRS configuration, the CSIRS configuration, the TRS reference signal and the CSIRS reference signal are explained below in the patent disclosure.

Reuse of CSIRS/TRS in an idle/inactive mode: In an embodiment herein, the connected mode CSI-RS and/or TRS reference signal may be reused in idle/inactive mode to achieve at least one of time, frequency, phase, gain synchronization, power saving, RRM measurement, channel measurements and system capacity enhancement. The CSIRS/TRS reference signal is used in connected mode for a channel feedback and/or mobility measurement and/or time-tracking and other AGC/AFC synchronization purposes. The CSIRS/TRS reference signal is a UE specific in the connected mode, that implies the UE (200) receives a dedicated configuration for the reference signal resources and its parameters and timer-frequency allocations. However, from a network entity perspective, the network entity (300) may use the same UE specific reference signal configuration(s) for one UE (200) or may be for multiple connected UEs (though a specific UE may not be aware about this). For example, all UEs having same connected DRX (C-DRX) configurations are assigned with the same set of CSIRS/TRS configuration to bring in alignment between active time of the C-DRX for the UEs and their CSIRS/TRS operations. In an embodiment, when there is only one connected UE (200) utilizing the UE-specific reference signal configuration(s), the configuration may be released by the network entity (300), when the UE is the idle and/or inactive mode. However, when there are still more UEs (200) receiving/utilizing the same reference signal configuration(s), the network entity (300) may retain the configuration(s) even after the specific UE moves out of the connected mode. Embodiments herein disclose reuse of the connected mode reference signals with their active configurations being used for connected mode UEs (200) to be made available and re-used for UEs (200) in the idle mode and/or inactive mode. These idle and/inactive mode UEs (200) are either the UEs (200) which have moved from connected mode and/or the UEs (200) which are in Idle/Inactive mode due to power on, initial access, cell selection and/or cell reselection to the current cell.

In an embodiment herein, reuse of at least one of CSIRS/TRS and/or DMRS and/or common MBS RS (multicast broadcast service reference signal that are provided in the MBS BWP or the frequency region) for the connected mode UEs (200) in the dedicated/initial/default BWP are reused for the idle and/or inactive mode UEs (200). The reuse may be for at least one of the reception of MBS service in the idle and/or inactive mode, and/or for the time, frequency, gain, phase synchronization or RRM measurement and/or for power saving and/or system capacity enhancement purposes in the idle and/or inactive mode.

In an embodiment herein, reuse of the CSIRS/TRS resources which are provided only in an initial BWP for connected mode UEs (200) are reused for the idle mode and/or inactive mode UEs (200). Further, in another embodiment, only the at least one of the CSIRS/TRS reference signal and/or the CSIRS/TRS configuration provided in the BWP or the frequency resource that is matching between the connected mode and the idle and/or the inactive mode is provided for reuse for the idle and/or inactive UEs (200).

In an embodiment herein, reuse of CSIRS/TRS resources which are provided in the initial BWP and/or default BWP and/or dedicated BWPs for connected mode UEs (200) are reused for the idle and/or inactive mode UEs (200).

In an embodiment herein, CSIRS/TRS resources of the connected mode UEs, is received and/or utilized by the UE (200) in idle mode or inactive mode only in the initial BWP.

Reuse approach: In an embodiment herein, the UE (200) in the idle and/or inactive mode is provided with the 1. One or more same CSIRS/TRS configuration and/or scrambling/descrambling identity as it was having in connected mode before moving into the idle/inactive mode (UE specific configurations).

2. One or more same CSIRS/TRS configuration and/or scrambling/descrambling identity as it was having, sharing along with a group of other connected mode UEs (200), in the connected mode before moving into the idle/inactive mode (group of UE specific configurations).

3. One or more same CSIRS/TRS configuration and/or scrambling/descrambling identity as it was having, sharing along with a group of other connected mode UEs (200), in the connected mode that have same C-DRX configurations, before the UE (200) moving into Idle/Inactive mode (group of UE specific configurations, also with same C-DRX configuration).

4. One or more CSIRS/TRS configuration and/or common scrambling identity, which is being used by any connected mode UE(s) (200) and reused for Idle/Inactive mode (general reuse of connected CSIRS/TRS configurations).

Partial or complete reuse of CSIRS/TRS: In an embodiment, at least one or more or all the configurations of CSIRS/TRS being used in the connected mode are reused for the idle/inactive mode purpose. Though all the configurations for the CSIRS/TRS reference signal would be transmitted by the network to support connected mode UEs (200), by controlling the actual number of the configurations to be reused for the idle/inactive mode UEs (200), the proposed method can be used to reduce the complexity and/or signaling requirements in the idle/inactive modes. Further, the proposed method provides for the partial or complete reuse of one or more configurations e.g., number of antenna ports, density or CDM (Code-division multiplexing) to be reused in Idle/Inactive mode as compared to the connected mode and further reduce the complexity of the operations.

Periodic, aperiodic and SPS delivery modes: In an embodiment, one or more CSIRS/TRS configuration that is being reused in the idle and/or inactive mode is at least one of periodic, aperiodic, and semi-persistent scheduled (SPS) delivery modes and transitions/changes across these modes can occur dynamically. The UE (200) in the idle/inactive mode is informed or signaled about the applicable delivery mode and/or transitions. Alternatively, the UE (200) in the idle/inactive mode determines the delivery mode implicitly e.g., by blindly decoding at each potential occurrence of the CSIRS/TRS reference signal and evaluating against a threshold value. When the signal strength is more than the required threshold, the presence is determined and thereby, utilization of reference signal for the idle/inactive mode UE (200) is pursued. Otherwise, the UE (200) determines there is no presence of reference signal and/or it is not usable for the UE.

Dedicated signaling: In an embodiment, one or more CSIRS/TRS configurations that need to reused in the idle/inactive mode is provided to the specific UE (200) that is transiting from the connected mode to the idle/inactive mode utilizing at least one of the approaches as:

1. The UE (200) receives a RRC release message and the message includes the CSIRS/TRS configurations that will be reused in the idle and/or inactive mode.
2. The UE (200) receives the RRC release with suspend configuration and the message includes the CSIRS/TRS configurations that will be reused in the inactive mode.
3. The UE (200) receives the RRC release with redirection and the message includes the CSIRS/TRS configurations that will be reused in the idle and/or inactive mode and the network entity (300) may also specify cell and/or frequency where it will be reused.
4. The UE (200) receives RRC configuration or reconfiguration message and the message includes the CSIRS/TRS configurations that will be reused once the UE (200) transits to the idle and/or inactive mode.

Further, CSIRS/TRS configuration received by the UE (200) pertains to at least one of the following 1. One or more of the CSIRS/TRS configuration(s) that was being used by the UE (200) in the connected mode only would be reused for the UE (200) in the idle and/or inactive mode.
2. One of more of the CSIRS/TRS configuration(s) that was not being used by the UE (200) in the connected mode only would be reused for the UE (200) in the idle and/or inactive mode.
3. Any combination of CSIRS/TRS configuration(s) that is available or would be used in connected mode is provided to the UE (200) for reusing in the idle/inactive mode.

Further, in another embodiment, at least one of the NZP (non-zero power) and ZP (zero power) CSIRS/TRS reference signal configurations of the Connected UE (200) is provided in the RRC message like RRC Release to the UE (200) to be reused in the idle/inactive mode.

Further, in another embodiment, when the UE (200) moves to the idle and/or inactive mode from connected mode, network entity (300) releases/discontinues at least one of the UE specific CSIRS/TRS configuration(s) that the UE (200) used in the connected mode e.g., there is no other connected mode UE present that uses the same configuration. Alternatively, the network entity (300) can reassign the at least one of the UE specific CSIRS/TRS configuration(s) that the UE (200) used in the connected mode to the other connected mode UE(s).

Further, in another embodiment, when at least one of the CSIRS/TRS configuration(s) that was being used by the UE (200) in the connected mode only would be reused for the UE (200) in the idle and/or inactive mode, the UE (200) is informed in the RRC message e.g., RRC Release by configuration index, without explicit configuration, as the UE (200) can map the configuration index to the CSIRS/TRS configuration it was configured in Connected mode e.g., in RRC Reconfiguration message and determine detailed parameters.

Further, in another embodiment, the RRC message e.g., RRC Release includes an exhaustive list of CSIRS/TRS configurations that would be reused in idle and/or inactive mode. The configuration indices or identifies may also be provided. Further, the UE (200) may also be informed which of the configurations that can be pursued in the idle/inactive mode e.g., when the network entity (300) is aware about the Paging Occasion (PO)/Paging Occasion (PF) of the UE (200) to be used in the idle/inactive mode. Alternatively, the UE (200) determines which of the configurations that can be pursued in the idle/inactive mode considering the PO/PF of the UE (200) to be used in the idle/inactive mode. Further, in another embodiment, the RRC message e.g., the RRC Release includes or encapsulates the CSIRS/TRS configurations that are being provided in the system information broadcast signaling in the present cell and therefore, provides the UE (200) with the configurations it needs in Idle/Inactive mode on the present cell early e.g., the UE (200) may not need to read SIB at least in the beginning for CSIRS/TRS configuration or until it is not changed or the cell is not changed.

In another embodiment, the RRC message like RRC release also provides the CSIRS/TRS configurations for the serving as well as neighbor cells to the UE (200) e.g., exhaustive list of the configurations that are being used in serving and/or neighbor cells or a selected list of the configurations that are suitable for the UE (200) in serving and/or neighbor cells.

Broadcast signaling: In an embodiment herein, one or more CSIRS/TRS configurations that need to reuse in the idle/inactive mode is provided to the UEs (200) in the system information broadcast (SIB). This SIB can include at least one of SIB-1, SIB-2 or a new SIB message. If the new SIB is provided, scheduling information for the new SIB is provided through SIB-1. Alternatively, the new SIB can be received through SIB on demand approach, so that the UEs (200) requiring CSIRS/TRS configuration in Idle/Inactive mode can receive it on demand. The UE (200) determines the on demand availability of the new SIB from the broadcasting ON flag in the SIB1. In another embodiment, CSIRS/TRs configurations can be provided in a combination of SIB-1 or SIB-2 or new SIB e.g., configuration indices can be provided in SIB-1 whereas detailed configuration can be provided in new SIB.

In an embodiment herein, support for feature of reuse of connected mode CSIRS/TRS for Idle and/or Inactive mode is identified by the UE (200) by the presence of scheduling information of new SIB in SIB1, when new SIB is used to carry at least one CSIRS/TRS configuration. In another embodiment, support for feature of reuse of connected mode CSIRS/TRS for Idle and/or Inactive mode is identified by the UE (200) by an identification field or a flag present in SIB1, when an existing SIB (e.g., SIB2) is used to carry at least one CSIRS/TRS configuration. For instance, Identification field value 1 or flag value TRUE would indicate support for the feature of reuse of connected mode CSIRS/TRS for Idle and/or Inactive mode; otherwise, it is not supported with Identification field value 0 or flag value FALSE.

In an embodiment, one or more CSIRS/TRS configurations that need to reused in the idle/inactive mode is provided to the UEs (200) in the combination of RRC message like RRC Release and SIB like SIB-1/SIB-2 and/or new SIB, and/or SIB on demand. For example, the RRC release can provide the CSIRS configurations for the UEs (200) transiting to the idle/inactive mode, whereas the SIB approach can be used for the CSIRS/TRS configuration for the UEs (200) that are doing power on, initial access, cell selection or cell reselection. Further, the RRC Release can provide the configuration for the specific UE (200) and/or exhaustive configurations that are to reused in idle/inactive mode, whereas the SIB provides configurations for all the UEs (200) in idle/inactive mode in the cell or in the area or in serving cell and in neighboring cells with exhaustive configurations that are to reused in idle/inactive mode.

In an embodiment, the scope of the SIB (e.g. a new SIB) used for configuration for CSIRS/TRS can be configured for a cell or an area. This can be indicated by the network to the UE (200) through the SIB scope parameter.

In an embodiment, the CSIRS/TRS configuration provided in the SIB (e.g. a new SIB) can be separated into a common part and a reference signal specific (e.g. CSIRS/TRS specific) part.

The UE (200) determination or selection of CSIRS/TRS configuration for Idle/Inactive mode: In another embodiment, the UE (200) can by itself determine which of the CSIRS/TRS configurations (e.g., provided in dedicated signaling like RRC Release and/or in broadcast signaling like System Information Broadcast) that can be pursued by the UE (200) in the idle/inactive mode; there are many factors that the UE (200) can use for this determination.

The UE (200) selects one or more or combination of the CSIRS/TRS configuration(s) that matches best with the PF/PO e.g., occurring closest to the PF/PO and/or have suitable periodicity. The UE (200) can also dynamically change configuration as and when needed e.g., when the PF/PO changes and/or the CSIRS/TRS configuration is changed or is no longer available/transmitted by the network entity (300) or power saving performance degrades for the UE (200) or signal strength degrades for the UE (200).

The UE selects one or more or combination of the CSIRS/TRS configuration(s) that provides best power saving performance e.g., the UE (200) is required to be awake lesser time during the idle/inactive mode.

Change of UE ID for the UE (200): The UE (200) identity 5G-S-TMSI that is used in 5G is temporary and it can change frequently e.g., during NAS procedure, mobility updates, cell reselection, security update, GUTI reassignment procedure. As PF/PO for the UE (200) is liked with the UE ID, therefore, when the UE ID changes, the PF/PO also changes for the UE (200). In an embodiment herein, the UE (200) determines the best suitable CSIRS/TRS configuration for use in Idle/Inactive mode among the provided CSIRS/TRS configuration through dedicated signaling and/or broadcast signaling considering the updated PO/PF for the UE (200) e.g., maximizing performance, maximizing power saving, selecting configuration(s) closest to the updated PO/PF etc. Further, in an embodiment, when the cell or area changes or paging configuration changes causing the change of PF/PO, the UE (200) determines the best suitable CSIRS/TRS configuration(s) as disclosed earlier.

Presence and/or absence of the CSIRS/TRS configuration: In an embodiment herein, the UE (200) in the Idle/Inactive mode is informed about the presence and/or absence of the CSIRS/TRS reference signal and/or CSIRS/TRS configuration, i.e., when there is no transmission CSIRS/TRS reference signal or removal/release of CSIRS/TRS configuration in the connected mode by the network. This may pertain to at least one of the following:

1. Connected mode UE(s) (200) are in inactive time of the DRX cycle and the network does not transmit the CSIRS/TRS reference signal.
2. The connected mode UE(s) (200) switches to active time of the DRX cycle and the network entity (300) restarts transmitting the CSIRS/TRS reference signal.
3. There is a potential collision of the CSIRS/TRS reference signal with the configured DMRS (Demodulation Reference Signal) for the connected mode UE(s) (200), the network entity (300) does not transmit the CSIRS/TRS reference signal.
4. The CSIRS/TRS reference signal is transmitted, when the condition for downlink symbol in the slot in which the CSIRS/TRS is to be transmitted is not matched.
5. There is change in delivery mode of the CSIRS/TRS in the connected mode e.g., among periodic, aperiodic and semi-persistent.
6. The CSIRS/TRS configuration is changed e.g., periodicity, offset, measured bandwidth, frequency domain allocation, pattern, reference timing cell change, change of association with SSB etc.
7. The CSIRS/TRS configuration is discontinued or released and/or reassigned to other UEs with different configuration parameters.
8. Change of BWP (Bandwidth part), sub-carrier spacing (SCS), BWP size change etc. e.g., from change of active/dedicated BWP of the connected mode UE (200) to another dedicated BWP/initial BWP/default BWP.
9. Expiry of bwp-Inactivitytimer or deactivation of the BWP or the BWP becoming dormant.
10. Activation of the BWP or dormant to non-dormant transition.
11. Expiry of the Cell-deactivation timer, reception of cell deactivation MAC CE command.
12. Activation of the serving cell, reception of the cell activation MAC CE command.
13. Measurement gaps for the UE(s) (200) causing no transmission of CSIRS/TRS reference signal of at least one of the CSIRS/TRS configurations.
14. Dynamic Spectrum Sharing (DSS) for the time and frequency resources are hared across LTE and NR and non-continuation or non-transmission of the CSIRS/TRS reference signal, when time and frequency resources are given to LTE or LTE MBSFN purpose.
15. The connected mode UE(s) (200), receiving at least one CSIRS/TRS configuration, are pursuing coordinated gaps with network for multi-SIM operation.
16. The CSIRS/TRS reference signal is not transmitted in accordance with at least one of the dynamic allocations through DCI (Downlink Control Information), SFI (slot Format Indicator) signaling, RRC configuration/broadcast signaling for dedicated/common UL-DL-TDD configuration, and in accordance with the rules specified for the slot format in 5G specifications.
17. WUS (Wake-Up Signal) indicates no DCI allocation in the On-duration of next DRX cycle and the On-duration timer is not started. In this case, the CSIRS/TRS reference signal may or may not be provided to the connected mode UE(s).

18. MBS service allocation (e.g., BWP and/or frequency resources) is changed in connected mode and in turn, affecting the CSIRS/TRS reference signal provisioning.

In an embodiment herein, the UE (200) in the idle/inactive mode is informed about the presence and/or absence of the CSIRS/TRS reference signal and/or CSIRS/TRS configuration through at least one of the following approaches. The presence or absence of the at least one of the CSIRS/TRS configurations can be conveyed by a bit and/or bitmap and/or code-points and/or a list of configuration indices.

1. Paging: Paging DCI (Downlink Control Information) carries the presence and/or absence of the CSIRS/TRS reference signal and/or CSIRS/TRS configuration. This can be indicated by one or more bits. One bit indicates the presence or absence for overall CSIRS/TRS configuration and with more bits, each bit can represent the presence or absence of specific CSIRS/TRS configuration, where the bit order represents configuration index of the CSIRS/TRS configurations.

2. Paging PDCCH: Paging payload on PDCCH carries the signaling information as described earlier.

3. SIB: At least one of the SIB from SIB-1, SIB-2 or a new SIB carries the information.

4. Paging for sib modification: Presence or absence of the CSIRS/TRS configuration is conveyed through SIB and paging for SIB modification indicates the change of SIB contents i.e., presence or absence information.

5. Short message: Short message with at least a bit to represent the presence or absence of the CSIRS/TRS configuration.

6. PDCCH DCI: A specific DCI e.g., DCI 1C or any other DCI carries the presence or absence of the CSIRS/TRS configuration in at least one bit indication.

7. WUS (Wake-up Signaling): WUS signaling used for idle and/or inactive mode and also carries at least 1-bit indication for presence or absence for the CSIRS/TRS configuration at least in the following DRX/Paging cycle.

8. PEI (Paging Early Indication): PEI signaling (e.g. PDCCH of PEI) used for Idle and/or Inactive mode also carries at least 1-bit indication for presence or absence for CSIRS/TRS configuration at least in the following DRX/Paging cycle.

In another embodiment, the UE (200) is informed about the presence (ON) and/or absence (OFF) duration, e.g., when is temporarily no transmission of reference signal for some duration, the UE (200) is informed about this duration in the signaling message, in addition to presence or absence indication.

In an embodiment herein, the UE (200) in the idle/inactive mode performs blind decoding and/or is not informed about the presence and/or absence of the CSIRS/TRS reference signal and/or CSIRS/TRS configuration(s).

Configuration change indication: In an embodiment herein, the UE (200) in the idle/inactive mode is informed about the change of the at least one of the CSIRS/TRS configurations through at least one of the following approaches. This also includes the addition of the new CSIRS/TRS configuration and/or removal of the existing CSIRS/TRS configuration. The change of the at least one of the CSIRS/TRS configurations can be conveyed by a bit and/or bitmap and/or code-points and/or a list of configuration indices.

1. Paging: Paging DCI (Downlink Control Information) carries the change indication of the CSIRS/TRS reference signal and/or CSIRS/TRS configuration. This can be indicated by one or more bits. One bit indicates the change for overall CSIRS/TRS configuration and with more bits, each bit can represent change of specific CSIRS configuration, where the bit order represents the configuration index of the CSIRS/TRS configurations.

2. Paging PDCCH: Paging payload on PDCCH carries the signaling information as described earlier.

3. SIB: At least one of the SIB from SIB-1, SIB-2 or a new SIB carries the information.

4. Paging for sib modification: Change of the CSIRS/TRS configuration is conveyed through the SIB and paging for the SIB modification indicates the change of the SIB contents, i.e., change of CSIRS/TRS configuration(s).

5. Short message: Short message with at least one bit to represent the change of the CSIRS/TRS configuration.

6. PDCCH DCI: A specific DCI e.g., DCI 1C or any other DCI carries the change of CSIRS/TRS configuration in at least one-bit indication.

7. WUS (Wake-up Signaling): WUS signaling used for the Idle and/or the Inactive mode also carries at least 1-bit indication for change for the CSIRS/TRS configuration at least in the following DRX/Paging cycle.

8. PEI (Paging Early Indication): PEI signaling (e.g. PDCCH of PEI) used for the Idle and/or the Inactive mode also carries at least 1-bit indication for change of the CSIRS/TRS configuration at least in the following DRX/Paging cycle.

In another embodiment, the bitmap is used to indicate the change or no change to one or more CSIRS/TRS configurations. The bitmap and actual configurations can be provided to the UE (200) in the same message or two separate messages, e.g. firstly the bitmap with each bit with its bit value (i.e., value 0 and value 1) representing whether there is a change or no change of CSIRS/TRS configuration and secondly the actual configurations of the one or more CSIRS/TRS configurations. Bits order in the bitmap represents the index or order of the CSIRS/TRS configuration. In another example, the bitmap can be provided in the paging, SIB-1 or SIB-2 etc. message and CSIRS/TRS configurations can be provided in a new SIB message.

In an embodiment, the UE (200) in the idle/inactive mode performs blind decoding and/or is not informed about the change of the at least one of the CSIRS/TRS configurations.

In an embodiment, the UE (200) in the idle/inactive mode is provided with a combined indication for presence/absence of CSIRS/TRS reference signal and CSIRS/TRS configuration change e.g., when only one bit is used for this indication it implies of either of the two or both of them, when two bits and/or more bits are used, then every two bit set have one bit represents presence/absence of CSIRS/TRS reference signal and second bit represents change of at least one of the CSIRS/TRS configurations.

Data-Inactivity timer expiry: In an embodiment herein, the CSIRS/TRS configuration is reused for Idle/Inactive mode for the serving cell and/or the neighboring cells are provided in the RRC release message. However, there may be possible scenario when the UE (200) may not receive the RRC release message, e.g., due to poor channel conditions causing decoding error to receive RRC Release. This may cause a RRC state mismatch between the UE (200) and the network entity (300) and therefore, the UE (200) is required to locally release RRC connection and move to the idle state.

For this purpose, the dataInactivityTimer is operated to consider reception and/or transmission of the MAC SDU on the DCCH and/or the DTCH and/or the CCCH logical channels. If any MAC entity (which implies at least one of component carriers or serving cells and/or dual/multi connectivity cell-groups and/or serving cells) receives or transmits a MAC SDU, the dataInactivityTimer is started or restarted (i.e., if it is already started and running). When the dataInactivityTimer expires, it is indicated to the upper layer e.g., RRC or PDCP etc. For instance, when the RRC receives this indication, it releases the RRC connection and transits the UE (200) to the idle state.

As there is loss of CSIRS/TRS configuration for serving cell and/or for neighbor cells, the proposed method provides following solutions to address the issue.

1. Option 1: the UE (200) utilizes the CSIRS/TRS configuration for serving cell and/or for neighbor cells received in previous RRC release message.
   a) Option 1A: When this is the first RRC Release message,
      I. The UE (200) does not apply the CSIRS/TRS configuration in the idle/inactive mode.
      II. The UE (200) avails the CSIRS/TRS information from the broadcast signaling e.g., SIB. Paging etc.
2. Option 2: The UE (200) utilizes the CSIRS/TRS configuration for the serving cell and/or for neighbor cells received in the SIB.
3. Option 3: The UE (200) sends the request for CSIRS/TRS configuration before or after expiry of the dataInactivityTimer to the network entity (300).
4. Option 4: The UE (200) utilizes the stored CSRIRS/TRS configuration for the serving cell and/or for the neighbor cells.
5. Option 5: The UE (200) avails the CSIRS/TRS from broadcast signaling using the on-demand SIB.
6. Option 6: The UE (200) performs blind decode operation for the CSIRS/TRS resources/reference signals.
7. Option 7: The UE (200) does not apply the CSIRS/TRS configuration in the idle/inactive mode.

In an embodiment, either one or both of RRC release and the SIB, i.e., combination of RRC release and System Information Block based CSIRS/TRS configuration for the serving cell and/or for the neighbor cells is used by the UE (200). In certain cases, like initial access and Radio Link Failure (RLF), there may not be the RRC Release and associated information then, the UE (200) can rely on broadcasted information.

In an embodiment, the UE (200) utilizes the on-demand SIB to avail the CSIRS/TRS from the broadcast signaling in the current cell or area. For example, scope of the SIB can be cell specific or area specific that implies the SIB contents are valid through-out the area.

In an embodiment herein, the configuration for the CSIRS/TRS to be used for idle/inactive mode includes at least one of resource-type which can be periodic, aperiodic or semi-persistent, scrambling identity or sequence generation configuration, resource periodicity and offset, subcarrier spacing, number of physical resource blocks, start of physical resource block, density of reference signal, frequency domain allocation, number of ports, code division multiplexing, in time domain first OFDM symbol, frequency band, CSIRS or TRS index, Quasi-colocation information, associated SSB information e.g. SSB index, power control offset of CSIRS/TRS as against SSB, serving cell for timing reference, BWP identity etc.

In an embodiment, a possible structure for the configuration for CSIRS/TRS as provided in the new SIB (SIBx) is described as following Table 1:

TABLE 1

```
SIBx ::= SEQUENCE {
trs-ResouceSetlist   SEQUENCE   (SIZE   (1..FFS))   OF   TRS-
ResourceSetConfig
OPTIONAL, -- Need R
lateNonCriticalExtension OCTET STRING OPTIONAL,
...
}
TRS-ResourceSetConfig ::= SEQUENCE {
powerControlOffsetSS ENUMERATED{db-3, db0, db3, db6},
scramblingID ScramblingId,
firstOFDMSymbolInTimeDomain INTEGER (0..9),
startingRB INTEGER (0..maxNrofPhysicalResourceBlocks-1),
nrofRBs INTEGER (24..maxNrofPhysicalResourceBlocksPlus1),
ssb-Index SSB-Index,
periodicity AndOffset CSI-ResourcePeriodicity AndOffset,
frequencyDomainAllocation BIT STRING (SIZE (4)),
...
}
```

In another embodiment, the network entity (300) provides the CSIRS/TRS resources to the UEs (200) in the idle/inactive mode with at least one of indicating availability of the CSIRS/TRS resources, indicating no availability of the CSIRS/TRS resources, not indicating any information (e.g., presence/absence of CSIRS/TRS and/or CSIRS/TRS configuration) of the CSIRS/TRS resources and lets the UE (200) to decode by itself e.g., blind decoding by the UE (200). Further, it may also not be possible for the network entity (300) to indicate all the changes to CSIRS/TRS to the idle or inactive mode UEs (200) e.g., not transmitting at a few occasions due to conflicting situations between reference signals for the connected mode UEs. The network entity (300) expects that the UE (200), when performing measurements over reference signal, determines such situations by itself.

In another embodiment, the UE (200) decodes the presence or absence of the CSIRS/TRS reference signal by itself, e.g., by blind decoding of the reference signal. This can be performed when either at least one the CSIRS/TRS configuration is provided and/or the CSIRS/TRS configuration is not provided. Further, the UE (200) can restrict the blind decoding of the CSIRS/TRS to the occasions, which are close to paging occasion (PF/PO) for the UE (200) to receive Core/RAN paging in the idle/inactive mode and/or to the occasions, where the CSIRS/TRS configurations are available/provided, and/or to the occasions where the UE (200) may be receiving other services e.g., NR MBS (Multicast Broadcast service) or unlicensed or non-3GPP service. Further, the UE (200) compares the CSIRS/TRS reference signal measured outcome with the prespecified by the standards/configured by the network entity (300)/UE determined threshold to evaluate if the measured CSIRS/TRS is present and/or suitable for synchronization/measurement purposes. When the threshold criteria are met, the CSIRS/TRS resource is utilized; otherwise, the CSIRS/TRS resource is not used or ignored or determined as not present. The UE determined threshold may be the average running measured value or last immediate measurement value or an expected measured value e.g., considering the signal strength conditions of the UE (200). Sudden deviation(s) in the measured value can be either due to non-presence of the CSIRS/TRS resources or transmission or movement of the UE (200) to places with low coverage e.g. basement, elevator or tunnel. In either cases, it is suitable to determine the CSIRS/TRS resources as not reliable for use.

In an embodiment, in order to not increase power consumption and/or signaling to the idle/inactive mode UEs, all the changes to the CSIRS/TRS to the idle or the inactive mode UEs (200) are not provided e.g., the network entity (300) not transmitting at a few occasions due to some conflicting situations between the reference signals for the connected mode UEs (200). For instance, the idle mode UE (200) may be indicated for change to the CSIRS/TRS only at when it comes to wakefulness for paging reception occasion and/or previous CSIRS/TRS reception occasion and/or dependent on the periodicity of the SIB and/or idle/inactive mode DRX cycle etc. Therefore, it is proposed that 1. The Idle/Inactive mode UE (200) also applies blind decoding and evaluation approach as mentioned earlier, irrespective of the presence/absence of the CSIRS/TRS indicated and/or the configuration of the CSIRS/TRS indicated.
2. Connected mode CSIRS/TRS resources, which are being reused for the Idle/Inactive mode, are not changed or released as far as possible very frequently e.g., within the periodicity of SIB.
3. Idle/Inactive mode UE utilizes the DSS information and/or the common ULDL-TDD configuration to determine the candidate occasions for CSIRS/TRS resources/transmission.

In another embodiment, when the UE (200) transits from the idle and/or inactive to connected mode, the UE (200) releases or abandons the CSIRS/TRS reference signal configurations it received or utilized or stored in the idle/inactive mode. The UE (200) receives the new CSIRS/TRS configuration in the connected mode.

In another embodiment, when the UE (200) transits between the idle and inactive modes, the UE (200) may need to change between the Core Network (CN) paging and Radio Access Network (RAN) paging and associated paging cycle and configurations. Accordingly, the UE (200) determines the CSIRS/TRS occasions that the UE (200) can receive and utilize that matches with the paging occasion or are closer to the paging occasion in respective paging mode. This would also provide enhanced power saving as the UE's (200) wake up occasions or periods will be curtailed.

In another embodiment, the UE (200) performs transitions from legacy approach (i.e., SSB based) to the CSIRS/TRS based reuse approach and/or fall back from CSIRS/TRS based reuse approach to the legacy approach based on the UE's determination. The determination is dependent on several factors that may include, but not limited to, periodicity SSB vs CSIRS/TRS, PO/PF position with respect to SSB and CSIRS/TRS occasion, power efficiency, signal conditions, performance, support of CSIRS/TRS on present/new cell e.g., when cell selection or cell reselection is performed etc.

In another embodiment, the UE (200) is provided with the CSIRS/TRS reference signal along with the WUS (Wake-up Signal) and/or PEI (Paging Early Indication). Paging PDSCH may also be cross-slot scheduled by the PDCCH in WUS or PEI. In this case, the CSIRS/TRS reference signal is scheduled over the cross-slot scheduled PDSCH. Alternatively, the UE (200) receives the CSIRS/TRS reference signal before or along with or after the WUS/PEI occasions to gain synchronization and/or perform measurements, while accessing paging information.

In another embodiment, when the UE (200) fails to decode or receive presence or absence of at least one CSIRS/TRS configuration and/or change of at least one CSIRS/TRS configurations and/or duration of at least one CSIRS/TRS configurations and/or at least one actual CSIRS/TRS configurations information in one of paging, SIB, WUS, PEI, PDCCH DCI, PDSCH, RRC Release etc., the UE (200) performs at least one of the following approaches:

1. The UE (200) transits to legacy approach of SSB resources based operation at least for that paging cycle or SIB repetition/modification period or until receiving CSIRS/TRS configuration related information again/
2. The UE (200) performs blind decoding for CSIRS/TRS resources.
3. The UE (200) abandons the reuse of CSIRS/TRS based operation at least for that paging cycle or SIB repetition/modification period or until receiving CSIRS/TRS configuration related information again.

In another embodiment, when the UE (200) performs cell selection and/or cell reselection, the UE (200) performs and/or switches to legacy SSB based reference signal approach when selected cell and/or reselected cell does not provide reuse of connected mode CSIRS/TRS reference signal and/or CSIRS/TRS configuration in Idle and/or Inactive mode.

In another embodiment, when the UE (200) performs cell selection and/or cell reselection, the UE (200) performs and/or continues CSIRS/TRS based reference signal approach when selected cell and/or reselected cell provides reuse of connected mode CSIRS/TRS reference signal and/or CSIRS/TRS configuration in Idle and/or Inactive mode.

In another embodiment, when the UE (200) maintains a white list/allowed list or book-keeping for cells which supports reuse of connected mode CSIRS/TRS reference signal and/or CSIRS/TRS configuration in Idle and/or Inactive mode and prioritize these cell(s) for cell selection and/or cell reselection.

In another embodiment, the network entity (300) indicates to the UE transition between legacy SSB based reference signal and/or reuse of CSIRS/TRS based reference signal approach for Idle and/or Inactive mode. For example, when the network entity (300) does not have CSIRS/TRS resources for reuse and/or does not want the UE to use CSIRS/TRS, it commands UE to transit to legacy approach or vice-versa. Network may indicate the transition in the at least one of SIB, Paging, PDCCH DCI, Paging PDSCH, WUS, PEI etc.

In another embodiment, the UE (200) may be configured with paging reduction feature which would allow the UE (200) to receive paging less frequently e.g., with utilizing longer paging cycle and/or skip some paging cycles in between to conserve power. In this case, the UE can also receive CSIRS/TRS reference signal in accordance with the updated paging cycle and/or based on skipped paging cycles.

Alternatively, in order to maintain the synchronization state and/or link sustenance, the CSIRS/TRS reference signal reception can be performed by the UE (200) in accordance with the original paging cycle even though paging reception is performed in accordance with the updated or skipped paging cycle.

In another embodiment, the network entity (300) informs the Idle and/or inactive mode UEs (200) about the support for the CSIRS/TRS reference signal and/or configuration by an indication of the feature support in the system information broadcast (SIB). This can be SIB1 or SIB2 or a new SIB. The scope of the SIB can be cell specific or area specific where in area provides larger scope and the UE (200) can be aware about the feature support in larger geography or more neighboring cells. The UE (200) can also utilize this information to prioritize the neighbor cell reselection which supports the feature for the CSIRS/TRS reference signal or configuration. The UE (200) can also maintain a cell list or stored information for the cells, which includes the support for the CSIRS/TRS reference signal and/or configurations and utilize this information for cell selection and/or cell reselection.

In another embodiment, the UE (200) informs the support for the CSIRS/TRS reference signal in the Idle/Inactive mode in the UE capability information message to the network entity (300). This can also be in response to the UE capability enquiry from the network or otherwise i.e., UE initiated. In another embodiment, the UE (200) provides the UE assistance information to the network, which includes at least one of PO/PF, 5G-S-TMSI or IMSI, need for power saving, support for MBS service etc.

In another embodiment, when the UE (200) is also receiving MBS in Idle/Inactive mode, it does not use or rely on the CSIRS/TRS reference signal and/or uses the MBS reference signal or utilizes the CSIRS/TRS which matches with the MBS reception timings.

In another embodiment, a MUSIM (multiple SIMs) UE (200) with the same PLMN for two or more SIMs utilizes the CSIRS/TRS measurement on one of the SIM, when other SIM(s) are also camped on to same cell and increases power saving.

FIG. 3 shows various hardware components of the UE (200), according to embodiments as disclosed herein. The UE (200) includes a processor (210), a communicator (220), a memory (230) and a resource handling controller (240). The processor (210) is coupled with the communicator (220), the memory (230) and the resource handling controller (240).

The resource handling controller (240) is configured to receive the SIB and the message from the network entity (300). The SIB and the message include at least one of the TRS configuration and the CSIRS configuration, when the UE (200) is in the idle mode or the inactive mode. Further, the resource handling controller (240) is configured to receive at least one of the TRS reference signal and the CSIRS reference signal from the network entity (300). Further, the resource handling controller (240) is configured to perform at least one action based on at least one of the TRS reference signal and the CSIRS reference signal. The action can include, for example, but not limited to AGC measurement, the STR measurement, the AFC measurement and the RRM measurement.

In an embodiment, the resource handling controller (240) is configured to determine the change of the TRS configuration and the CSIRS configuration through at least one of the SI update and the paging for SI change and receive the new SIB comprising at least one of the modified TRS configuration and the modified CSIRS configuration from the network entity (300), when the UE (200) receives at least of the SI update and the paging for SI change. Further, the resource handling controller (240) is configured to update at least one of the modified TRS configuration and the modified CSIRS configuration at the UE (200) and perform at least one action based on the at least one of the modified TRS configuration and the modified CSIRS configuration.

In an embodiment, the resource handling controller (240) is configured to receive the indication from the network entity (300), where the indication indicates at least one of the presence of the TRS configuration, the presence of the CSIRS configuration, the absence of the TRS configuration, and the absence of the CSIRS configuration.

In an embodiment, the resource handling controller (240) is configured to determine that at least one of the presence of the TRS configuration and the presence of the CSIRS configuration is detected at the UE (200). Further, the resource handling controller (240) is configured to determine at last one of the TRS configuration and the CSIRS configuration is suitable with respect to the PO of the UE (200) and the PF of the UE (200). Further, the resource handling controller (240) is configured to receive at least one of the TRS configuration and the CSIRS configuration at a configured occasion prior to the PO and the PF and perform the action based on the TRS and the CSIRS.

The resource handling controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 3 shows various hardware components of the UE (200) but it is to be understood that other embodiments are not limited thereon. In other embodiments, the UE (200) may include less or more number of components. Further, the labels or names of the components are used only for illustrative purpose and does not limit the scope of the invention. One or more components can be combined together to perform same or substantially similar function in the UE (200).

FIG. 4 shows various hardware components of the network entity (300), according to embodiments as disclosed herein. The network entity (300) includes a processor (310), a communicator (320), a memory (330) and a resource handling controller (340). The processor (310) is coupled with the communicator (320), the memory (330) and the resource handling controller (340).

The resource handling controller (340) configures the SIB and the message comprising at least one of the TRS configuration and a CSIRS configuration. Further, the resource handling controller (340) is configured to send at least one of the SIB and the message comprising at least one of the TRS configuration and the CSIRS configuration to the UE (200), when the UE (200) is in the idle mode or the inactive mode. Further, the resource handling controller (340) is configured to send at least one of the TRS reference signal and the CSIRS reference signal to the UE (200).

In an embodiment, the resource handling controller (340) is configured to determine the change of the TRS configuration and the CSIRS configuration and send the change of at least one of the TRS configuration and the CSIRS configuration through at least one of the SI update and the paging for SI change to the UE (200) upon determination.

In another embodiment, the resource handling controller (340) is configured to determine that at least one of the TRS configuration and the CSIRS configuration is not transmitted to the UE (200) and send the indication to the UE (200), where the indication indicates that at least one the TRS configuration and the CSIRS configuration is not transmitted from the network entity (300).

The resource handling controller (340) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (310). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 4 shows various hardware components of the network entity (300) but it is to be understood that other embodiments are not limited thereon. In other embodiments, the UE network entity (300) may include less or more number of components. Further, the labels or names of the components are used only for illustrative purpose and does not limit the scope of the invention. One or more components can be combined together to perform same or substantially similar function in the network entity (300).

FIG. 5 is a sequence diagram illustrating a method for the UE power saving in the wireless network (1000) using the TRS configuration and the CSIRS configuration, according to embodiments as disclosed herein.

At 502, the network entity (300) sends the SIB (including the TRS configuration/CSIRS configuration) to the UE (200). The network entity (300) determines the transmission of TRS/CSIRS (reuse of connected mode reference signal).

At 504, the network entity (300) sends the TRS/CSIRS availability indication (presence) to the UE (200). At 506, the network entity (300) sends the TRS/CSIRS reference signal to the UE (200). The UE (200) determines the TRS/CSIRS availability and receives the TRS/CSIRS at one of configured occasion before the PO.

Further, the network entity (300) determines the change of the TRS/CSIRS configuration. At 508, the network entity (300) indicates the TRS/CSIRS configuration change through the SI update to the UE (200). At 510, the network entity (300) sends the SIB (including the updated TRS/CSIRS configuration) to the UE (200). The UE (200) updates the TRS/CSIRS configuration by reading SIB. At 512, the network entity (300) sends the TRS/CSIRS availability indication (presence) to the UE (200). At 514, the network entity (300) sends the TRS/CSIRS reference signal to the UE (200).

Further, the network entity (300) determines the change of the TRS/CSIRS configuration. At 516, the network entity (300) sends the TRS/CSIRS availability indication (absence) to the UE (200).

FIG. 6 and FIG. 7 are example flow charts (600 and 700) illustrating methods for the UE power saving in the wireless network (1000) using the TRS configuration and the CSIRS configuration, according to embodiments as disclosed herein.

Referring to FIG. 6, at 602, the network entity (300) reuses the connected mode TRS/CSIRS resources for the UEs, when the UE (200) is the idle mode or the inactive mode. At 604, the UE (200) decodes the SIB X to receive the one or more TRS/CSIRS configurations in the idle mode or the inactive mode. At 606, the UE (200) selects the one or more TRS/CSIRS configurations and determines the presence or absence of one or more TRS/CSIRS transmission based on L1 signaling. At 608, If TRS/CSIRS presence is determined, the UE (200) decodes and receives the TRS/CSIRS reference signal for the selected configuration and utilize for one or more of AGC, AFC, STR and RRM measurements.

Referring to FIG. 7, at 702, the network entity (300) modifies the one or more TRS/CSIRS configuration and indicates to the UE (200) with the SI update or paging for SI change, when the UE (200) is the idle mode or the inactive mode. At 704, the UE (200) receives the SI update or paging for SI change and reads the SIB X to receive the new TRS/CSIRS configuration. At 706, the UE (200) determines if the UE's previous TRS/CSIRS configuration is changed/removed and/or there is a need to use a new TRS/CSIRS configuration. At 708, the UE (200) selects or reselects one or more TRS/CSIRS configurations and determines the presence or absence of one or more TRS/CSIRS transmission based on the L1 signaling. At 710, if TRS/CSIRS presence is determined, the UE (200) decodes and receives the TRS/CSIRS reference signal for the selected configuration and utilize for one or more of AGC, AFC, STR and RRM measurements.

FIG. 8 is a flow chart (800) illustrating a method, implemented by the UE (200), for the UE power saving in the wireless network (1000) using the TRS configuration and the CSIRS configuration, according to embodiments as disclosed herein. The operations (802-806) are performed by the resource handling controller (240). At 802, the method includes receiving at least one of the SIB and/or the message from the wireless network (1000). The SIB and/or the message include the TRS configuration and the CSIRS configuration, when the UE (200) is in the idle mode or the inactive mode. At 804, the method includes receiving at least one of the TRS reference signal and the CSIRS reference signal. At 806, the method includes performing at least one action based on at least one of the TRS reference signal and the CSIRS reference signal. The action can include, for example, but not limited to the AGC measurement, the STR measurement, the AFC measurement and the RRM measurement.

FIG. 9 is a flow chart (900) illustrating a method, implemented by the network entity (300), for the UE power saving in the wireless network (1000) using the TRS configuration and the CSIRS configuration, according to embodiments as disclosed herein. The operations (902 and 904) are performed by the resource handling controller (340).

At 902, the method includes configuring at least one of the SIB and the message comprising at least one of the TRS configuration and the CSIRS configuration. At 904, the method includes sending at least one of the SIB and the message comprising at least one of the TRS configuration and the CSIRS configuration to the UE (200), when the UE (200) is in the idle mode or the inactive mode.

The various actions, acts, blocks, steps, or the like in the flow charts (600-900) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The invention claimed is:

1. A method performed by a terminal in a wireless communication system, the method comprising:
    receiving, from a base station system information including one or more configurations of reference signal (RS) for tracking to be used in idle or inactive mode; and
    receiving, from the base station, a downlink control information (DCI) format for paging early indication including a bitmap indicating presence of at least one of the one or more configurations of RS for tracking;
    receiving, from the base station, an RS for tracking based on the DCI format for paging early indication; and
    performing time or frequency tracking based on the RS for tracking.

2. The method of claim 1, wherein the receiving of the system information comprises:
    receiving, from the base station, a system information block 1 (SIB1) including scheduling information for the system information; and receiving, from the base station, the system information based on the scheduling information.

3. The method of claim 1, further comprising receiving, from the base station, a short message including at least one bit to represent a change of the system information that includes the one or more configurations of RS for tracking.

4. The method of claim 1, wherein the one or more configurations of RS for tracking include at least one of:
information on a scrambling identity,
information on a first orthogonal frequency division multiplexing (OFDM) symbol in time domain,
information on a starting physical resource block,
information on a number of physical resource blocks,
information on a synchronization signal block (SSB) with quasi-collocation (QCL) information,
information on a periodicity and offset, or
information on a frequency domain allocation.

5. A method performed by a base station in a wireless communication system, the method comprising:
transmitting, to a terminal, system information including one or more configurations of reference signal (RS) for tracking to be used in idle or inactive mode; and
transmitting, to the terminal, a downlink control information (DCI) format for paging early indication including a bitmap indicating presence of at least one of the one or more configurations of RS for tracking; and
transmitting, to the terminal, an RS for tracking according to the DCI format for paging early indication.

6. The method of claim 5, wherein the transmitting of the system information comprises:
transmitting, to the terminal, a system information block 1 (SIB1) including scheduling information for the system information; and
transmitting, to the terminal, the system information according to the scheduling information.

7. The method of claim 5, further comprising transmitting, to the terminal, a short message including at least one bit to represent a change of the system information that includes the one or more configurations of RS for tracking,
wherein the one or more configurations of RS for tracking include at least one of:
information on a scrambling identity,
information on a first orthogonal frequency division multiplexing (OFDM) symbol in time domain,
information on a starting physical resource block,
information on a number of physical resource blocks,
information on a synchronization signal block (SSB) with quasi-collocation (QCL) information,
information on a periodicity and offset, or
information on a frequency domain allocation.

8. A terminal in a wireless communication system, the terminal comprising:
a transceiver; and
a controller configured to:
receive, from a base station via the transceiver, system information including one or more configurations of reference signal (RS) for tracking to be used in idle or inactive mode,
receive, from the base station via the transceiver, a downlink control information (DCI) format for paging early indication including a bitmap indicating presence of at least one of the one or more configurations of RS for tracking,
receive, from the base station via the transceiver, an RS for tracking based on the DCI format for paging early indication, and perform time or frequency tracking based on the RS for tracking.

9. The terminal of claim 8, wherein the controller is further configured to:
receive, from the base station via the transceiver, a system information block 1 (SIB1) including scheduling information for the system information, and
receive, from the base station via the transceiver, the system information based on the scheduling information.

10. The terminal of claim 8, wherein the controller is further configured to receive, from the base station via the transceiver, a short message including at least one bit to represent a change of the system information that includes the one or more configurations of RS for tracking.

11. The terminal of claim 8, wherein the one or more configurations of RS for tracking include at least one of:
information on a scrambling identity,
information on a first orthogonal frequency division multiplexing (OFDM) symbol in time domain,
information on a starting physical resource block,
information on a number of physical resource blocks,
information on a synchronization signal block (SSB) with quasi-collocation (QCL) information,
information on a periodicity and offset, or
information on a frequency domain allocation.

12. A base station in a wireless communication system, the base station comprising:
a transceiver; and
a controller configured to:
transmit, to a terminal via the transceiver, system information including one or more configurations of reference signal (RS) for tracking to be used in idle or inactive mode,
transmit, to the terminal via the transceiver, a downlink control information (DCI) format for paging early indication including a bitmap indicating presence of at least one of the one or more configurations of RS for tracking, and
transmit, to the terminal via the transceiver, an RS for tracking according to the DCI format for paging early indication.

13. The base station of claim 12, wherein the controller is further configured to:
transmit, to the terminal, a system information block 1 (SIB1) including scheduling information for the system information, and
transmit, to the terminal, the system information according to the scheduling information.

14. The base station of claim 12, wherein the controller is further configured to transmit, to the terminal via the transceiver, a short message including at least one bit to represent a change of the system information that includes the one or more configurations of RS for tracking.

15. The base station of claim 12, wherein the one or more configurations of RS for tracking include at least one of:
information on a scrambling identity,
information on a first orthogonal frequency division multiplexing (OFDM) symbol in time domain,
information on a starting physical resource block,
information on a number of physical resource blocks,
information on a synchronization signal block (SSB) with quasi-collocation (QCL) information,
information on a periodicity and offset, or
information on a frequency domain allocation.

* * * * *